United States Patent
Wood et al.

(10) Patent No.: US 7,567,661 B1
(45) Date of Patent: Jul. 28, 2009

(54) TELEPHONY SERVICE INFORMATION MANAGEMENT SYSTEM

(75) Inventors: Patrick Wood, Raleigh, NC (US); Stephen Sorice, Raleigh, NC (US); Ketan Shah, Cary, NC (US)

(73) Assignee: Nortel-Networks Limited, St. Laurent, Quebec (CA)

( * ) Notice: Subject to any disclaimer, the term of this patent is extended or adjusted under 35 U.S.C. 154(b) by 1199 days.

(21) Appl. No.: 10/749,828

(22) Filed: Dec. 31, 2003

(51) Int. Cl.
*H04M 3/42* (2006.01)
*H04M 15/00* (2006.01)

(52) U.S. Cl. ............ 379/201.02; 379/134; 379/201.04; 379/201.05; 379/201.12

(58) Field of Classification Search ............ 379/112.01, 379/133, 134, 201.03–201.05, 201.12
See application file for complete search history.

(56) References Cited

U.S. PATENT DOCUMENTS

| | | | |
|---|---|---|---|
| 4,797,910 A | 1/1989 | Daudelin | |
| 5,325,421 A | 6/1994 | Hou et al. | |
| 5,483,586 A | 1/1996 | Sussman | |
| 5,652,789 A | 7/1997 | Miner et al. | |
| 5,724,412 A | 3/1998 | Srinivasan | |
| 5,850,433 A | 12/1998 | Rondeau | |
| 5,884,262 A | 3/1999 | Wise et al. | |
| 5,915,001 A | 6/1999 | Uppaluru | |
| 5,978,806 A | 11/1999 | Lund | |
| 6,011,841 A * | 1/2000 | Isono | 379/201.01 |
| 6,014,634 A | 1/2000 | Scroggie et al. | |
| 6,031,836 A | 2/2000 | Haserodt | |
| 6,038,296 A | 3/2000 | Brunson et al. | |
| 6,065,016 A | 5/2000 | Stuntebeck et al. | |
| 6,069,890 A | 5/2000 | White et al. | |
| 6,091,808 A * | 7/2000 | Wood et al. | 379/201.04 |
| 6,097,793 A | 8/2000 | Jandel | |
| 6,125,113 A | 9/2000 | Farris et al. | |
| 6,259,771 B1 | 7/2001 | Kredo et al. | |
| 6,714,641 B2 * | 3/2004 | Kredo et al. | 379/258 |
| 7,020,262 B2 * | 3/2006 | Kredo et al. | 379/218.01 |

OTHER PUBLICATIONS

U.S. Appl. No. 09/193,277, filed Nov. 1998, Kredo, et al.

* cited by examiner

*Primary Examiner*—Harry S Hong
(74) *Attorney, Agent, or Firm*—Withrow & Terranova, P.L.L.C.

(57) ABSTRACT

The present invention provides a system and method enabling telephony service subscribers to access and use call-related information associated with telephony services. In one aspect, the present invention allows telephony service subscribers to access call-related information stored by telephony network nodes through use of service subscriber terminals connected to a telephony service provider server. In another aspect, both the subscriber terminals and the service provider server are connected to, and communicate through, a public data network. The service provider server is also disposed to communicate with various nodes of a telephony network using various telephony signaling protocols. In another aspect, the present invention receives requests to activate or deactivate telephony services from subscriber terminals and converts the requests into a format compatible with the telephony network nodes. In another aspect, the present invention allows service subscribers to place calls using call-related information received from the service information management system.

26 Claims, 3 Drawing Sheets

TELEPHONY SERVICE INFORMATION MANAGEMENT SYSTEM

FIELD OF THE INVENTION

The present invention relates to telecommunication services, and in particular to accessing and using call-related information monitored and stored by telecommunication services.

BACKGROUND OF THE INVENTION

The advent of intelligent telephony networks ("intelligent networks" or "IN") has allowed telephony service providers to offer customers a wide range of telephony-related services. In effect, intelligent network architectures have overlaid telephony voice networks with a second, data network used to more efficiently control and monitor the voice network. In these intelligent networks, the signals required to set up, monitor, and take down calls in the circuit-switched, time division multiplexed ("TDM") voice network have been implemented in a more efficient packet data network.

Although the early IN data networks were primarily used to control voice networks, the features of the IN data networks have allowed many telephony service providers to offer their customers (also called "service subscribers" or simply "subscribers" in this specification) telephony-related services which monitor and store various call-related information. One such service is commonly known as a "call log service" or as "call logging." In addition, service providers are constantly seeking to develop and commercialize new services to satisfy customer desires and increase revenue.

The Advanced Intelligent Network (AIN) architecture expands the potential of early intelligent networks and provides greater flexibility in creation and customization of telephony services for customers. Among other features, the AIN includes a set of standards governing intelligence in public networks which allow equipment manufacturers and service providers to design and develop custom services on various non-switch platforms that can interact with various telephony network nodes.

Specifications of the various releases of AIN specifications may be found in Bellcore AIN GR1299 Issue 6 and later editions, Bellcore AIN GR1298 Issue 6 and later editions, and related Bellcore standards (hereinafter "AIN Architecture Standards"). Bellcore was renamed Telcordia Technologies in 1999, and therefore the cited specifications and later editions may bear that name. The disclosures of the AIN Architecture Standards are incorporated by reference herein in their entirety. Those skilled in the art will recognize other call signaling and control technologies compatible with the concepts of the present invention are comparable to the AIN and will be considered within the scope of the description and claims of the invention that follow.

Many subscriber telephony services are currently implemented on end office switches ("EO switches," also called "end exchanges"). An end office is a type of central office that connects directly to customers and is where customer lines and trunks are interconnected. Subscriber telephony services may also be implemented in private branch exchanges ("PBXs") operated as part of enterprise telephony networks. Throughout this specification, an EO switch shall be understood to mean a switch that provides services to subscribers, or end-users, of telecommunication services and shall include all switches implementing telephony services for subscribers that are capable of directly or indirectly interacting with an intelligent network. The EO switch may take on many different configurations but in most cases will at least provide voice-based communications in a circuit-switched, packet-switched, or wireless infrastructure. Nortel Networks' DMS-100 system is an example of an EO switch. Those of ordinary skill in the art will realize that other telephony network switches from Nortel Networks and other manufacturers, including those not located in a telephone service provider's "central office" or "end-office" may perform similar or comparable functions to the DMS-100 system and are equivalent.

Although there has been a proliferation of telephony services, service subscribers have typically had limited control over, and limited access to, these services and the call-related information associated with the services. In many cases, call-related information may only be accessed at telephony equipment terminating the access line on which the telephony service is provisioned. In addition, it is often necessary to purchase special equipment in order to use certain services or access call-related information.

For example, in implementing a call log service, an EO switch may collect and maintain a list of the calls attempted, calls completed, and calls made to a particular subscriber line. Many subscribers with analog "plain old telephone service" ("POTS") lines and legacy telephone equipment may not be able to access the information stored by the call log service at all. Other subscribers may only be able to access the information if a telephony service provider has set up an interactive voice response ("IVR") system that essentially "reads" call log information to subscribers over their telephone. Subscribers who have purchased telephone equipment using special protocols, such as the Analog Display Services Interface ("ADSI") protocol, may be able to retrieve and view call log information using the small screen format of their special equipment, but only when the equipment terminates the line for which the service is provisioned.

In light of these limitations, there is a need for systems and methods that provide service subscribers with greater access to call-related information collected by telephony services. Furthermore, there is a need for service subscribers to access, from different devices and locations, call-related information collected by various telephony services. In addition, there is a need to provide enhanced service capability utilizing service information stored on network nodes.

SUMMARY OF THE INVENTION

The present invention provides systems and methods which provide telephony service subscribers with greater access to call-related information associated with their telephony services. Specifically, the telephony service information management system ("information management system") of the present invention allows subscribers to access call-related information stored by telephony network nodes through use of service subscriber terminals ("subscriber terminals") connected to telephony service provider server ("service provider server"). According to one aspect of the present invention, both the subscriber terminals and the service provider server are connected to, and communicate through, a public data network such as, for example, an internet. The service provider server is also disposed to communicate with various nodes of a telephony network using various telephony signaling protocols.

According to another aspect, the information management system of the present invention receives requests for call-related information stored by various telephony services from any of a number of different types of subscriber terminals. The information management system converts these requests for call-related information into a format compatible with the telephony network nodes that monitor and store the desired call-related information. The information management system then transmits the converted request to the telephony network node on which the call-related information is stored. When the information management system receives the requested call-related information, it converts the received information into a format compatible with the requesting subscriber terminal and transmits information to the requesting subscriber terminal.

According to another aspect, the information management system receives requests to activate telephony services from subscriber terminals and converts the requests into a format compatible with the telephony network nodes. The activation request is then transmitted to the telephony network node controlling telephony services for the requesting service subscriber in order to activate the service. The information management system may also be used to deactivate telephony services using the same process.

According to another aspect, the present invention allows service subscribers to place calls using call-related information received from the information management system. According to this aspect, service subscribers may select call-related information that includes directory numbers and request to have a call placed to the selected directory number. The call request is processed by the information management system which sends appropriate signaling messages to a telephony network switch to establish the requested call.

According to another aspect of the present invention, the information management system may send a subscriber identification request to a subscriber terminal in order to authenticate service subscriber's identity before enabling subscriber access privileges. The information management system then receives a response to the subscriber identification request including subscriber authentication data. The information management system then validates the subscriber authentication data by comparing received subscriber authentication data with subscriber profiles stored in a database accessible by the information management system. If validation is confirmed, the control system enables subscriber access privileges.

According to another aspect, the information management system of the present invention converts at least a portion of the received subscriber authentication data into a format compatible with the telephony network nodes serving the service subscriber. The information management system then transmits a request for the subscriber's service profile to a telephony network node maintaining a database of service profiles. The telephony network node responds by returning the requested service profile.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In a preferred embodiment, the information management system of the present invention is implemented in an AIN using standardized signaling protocols such as Common Channel Signal System No. 7 ("SS7") and functional network service elements, each of which is designed to fulfill specific call processing and service deployment functions. The various switching and processing elements of a telecommunication networks are generically referred to herein as "network nodes" or "nodes." Nodes in the telecommunication packet data network that originate and receive signaling messages, or transfer signaling messages from one signaling link ("SL") to another, or both, are generally referred to as signaling points ("SP"). Those skilled in the art will also recognize that numerous protocols may be implemented for communications in a telephony network, including, for example, AIN; Intelligent Network Application Part (INAP); Wireless Intelligent Network (WIN); Customized Applications for Mobile Network Enhanced Logic (CAMEL); Computer Telephony Interface (CTI); Primary Rate Interface (PRI) and ISDN User Part (ISUP).

Figure 1:
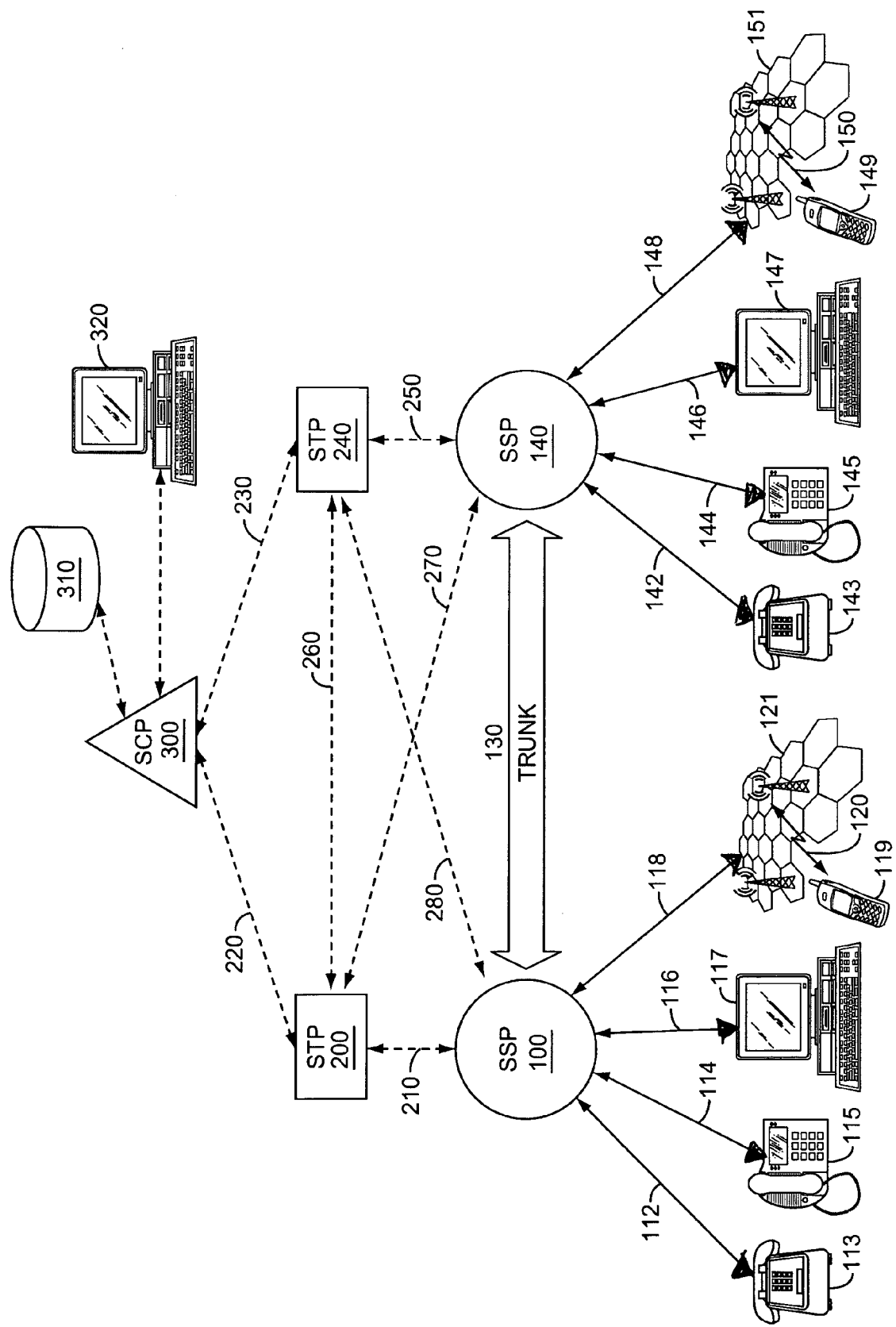
FIG. 1 illustrates a communication environment in which the present invention operates.

FIG. 1 illustrates certain components of the AIN in which a preferred embodiment is implemented. In the example shown in FIG. 1, an EO switch is considered to be a service switching point (SSP) 100 capable of interacting with the AIN using SS7 functionality. SSP 100 is preferably a programmable SP switch capable of recognizing AIN-type calls, launching queries to other network nodes, and receiving commands and data from other network nodes to further process and route AIN-type calls. Those of ordinary skill in the art will understand that many types of EO switches are signaling points that communicate directly with the AIN, whereas others rely on other intermediate equipment to facilitate communication with the AIN. Such architectures are considered equivalent for purposes of the present invention as long as communication with the EO switch is enabled. Those skilled in the art will recognize other call signaling and control technologies compatible with the concepts of the present invention.

Connected to SSP 100 are various telecommunication devices that may be associated with service subscribers. For example, SSP 100 may provide various service connections to service subscribers including, for example: analog POTS service through an analog connection 112 to a standard analog telephone 113; integrated services digital network service ("ISDN") over ISDN connection 114 to an ISDN terminal 115; and a digital fiber subscriber line service over fiber (or hybrid-fiber) connection 116 to a general purpose computer 117. Those of ordinary skill in the art will recognize that various intermediate network elements and connections may be used to connect subscribers to SSP 100.

SSP 100 may also include a wireless network connection 118 to a wireless network environment 121 providing wireless voice and data access over a common air interface 120 to a mobile handset 119. Although not specifically illustrated, the relationship between SSP 100 and the wireless network environment 121 will be understood by those of ordinary skill in the art to include any or all the functionalities associated with the following network elements: a mobile switch ("MSC"), a base station controller ("BSC"), a serving GRPS support node ("SGSN"), a packet data support node ("PDSN"), a gateway GPRS support node ("GGSN"), a radio node controller ("RNC"), a wireless data gateway, and other network elements necessary to implement the present invention.

As further shown in FIG. 1, SSP 100 and SSP 140 may be interconnected by direct trunks 130 and by tandem trunks (not shown) for carrying call traffic. Trunk 130 may be, for example, an SS7 controlled multi-frequency trunk, a primary rate interface trunk, or any other trunk for carrying voice traffic. The type of trunk used will be determined by the capabilities of both the sending and receiving SSP to which it is connected. It will be understood that trunking capabilities may enable transport of data and other types of traffic in addition to traditional TDM voice traffic over trunks.

Similar to SSP 100, SSP 140 may provide various service connections to service subscribers including, for example: an analog connection 142 to a standard analog telephone 143; an ISDN connection 144 to an ISDN terminal 145; and a fiber (or hybrid-fiber) connection 146 to a general purpose computer 147. SSP 140 may also include a wireless network connection 148 to a wireless network environment 151 providing wireless voice and data access over a common air interface 150 to a mobile handset 149. Those of ordinary skill in the art will recognize that various intermediate network elements and connections may be used to connect service subscribers to SSP 140. Those of ordinary skill in the art will also recognize that wireless network environment 151 may be the same wireless network environment represented by wireless network environment 121 for some applications even though the two wireless network environments are represented here as separate entities.

Not shown in FIG. 1 are many elements of the AIN connecting SSPs that allow transport of call traffic over local and inter-exchange carriers. Such features are described in the above-referenced AIN Architecture Standards.

Service logic in the AIN may reside in a service control point (SCP) 300 and associated SCP database 310. SCP 300 is an off-board processor that includes service logic, and related systems and information, which provision and administer services for completing voice calls and administering other telephony services. SCP 300 typically comprises an integrated system which may include a service management system (SMS) (not shown), a data and reports system (DRS) (not shown) for compiling call information to be used for billing and administrative purposes, and a service creation environment (SCE) (not shown). The SCE may comprise, for example, a programming environment for creating and provisioning services for subscribers.

SCP 300 may be provisioned with a SCP user interface 320 for accessing the various SCP systems and system information. The SCP user interface 320 may also be used to create, modify, and load services and service information into SCP 300 and SCP database 310. The SCP user interface 320 is also typically capable of retrieving information about specific subscribers or groups of subscribers from database 310, and displaying the information from use by the service provider.

In a preferred embodiment, SSP 100 communicates with various off-board processors such as SCP 300 using SS7. The SS7 includes protocols for basic call setup, management and teardown ("circuit" or "circuit-related" protocols) and also includes, among others, protocols enabling various call related features ("non-circuit" protocols).

Throughout most of the world, the SS7 ISDN User Part (ISUP) defines the protocol and procedures used to setup, manage and release trunk circuits that carry voice and data calls over the public switched telephone network and can be used for both ISDN and non-ISDN calls. For example, SSP 100 and SCP 300 may communicate over signaling links 210, 220 using the ISUP protocols to setup, management and release the trunk circuits carrying voice and data between terminating line exchanges (e.g., between a calling party and a called party). When SSP 100 is triggered by an AIN call, the triggered SSP 100 formulates an AIN service request using ISUP. SSP 100 then transmits the request over packet data network signaling links 210, 220 to SCP 300. SSP 100 then responds to call processing instructions from SCP 300 in which the AIN service logic resides.

One or more signal transfer points (STP) 200, 240 may also be disposed in the AIN to route signals efficiently between network signaling points (e.g., SSPs, SCPs and other STPs). For example, STP 200 may connect SCP 300 and SSP 100 over SL 220 and 210, respectively. Similarly, STP 240 may connect SCP 300 and SSP 140 over SL 230 and 250, respectively. STP 200 and STP 200 may be interconnected by a number of signaling links (e.g. signaling links 260, 270, and 280) to increase the efficiency of the networks and provide redundant signaling paths.

Another SS7 protocol, the SS7 Transaction Capabilities Application Part (TCAP) messaging protocol enables deployment and management of AIN services by supporting non-circuit related information exchange between signaling points. When a service provider changes a subscriber's service profile, the update communications between SCP 300 and SSP 100 are accomplished using the TCAP message that may be transmitted from SCP 300 to SSP 100 over data links 220 and 210 through STP 200. AIN specifications for TCAP messaging may be found in Bellcore AIN GR246, and other related Bellcore standards (hereinafter "TCAP Standards"). The disclosures of the TCAP Standards are incorporated by reference herein in their entirety.

Figure 2:
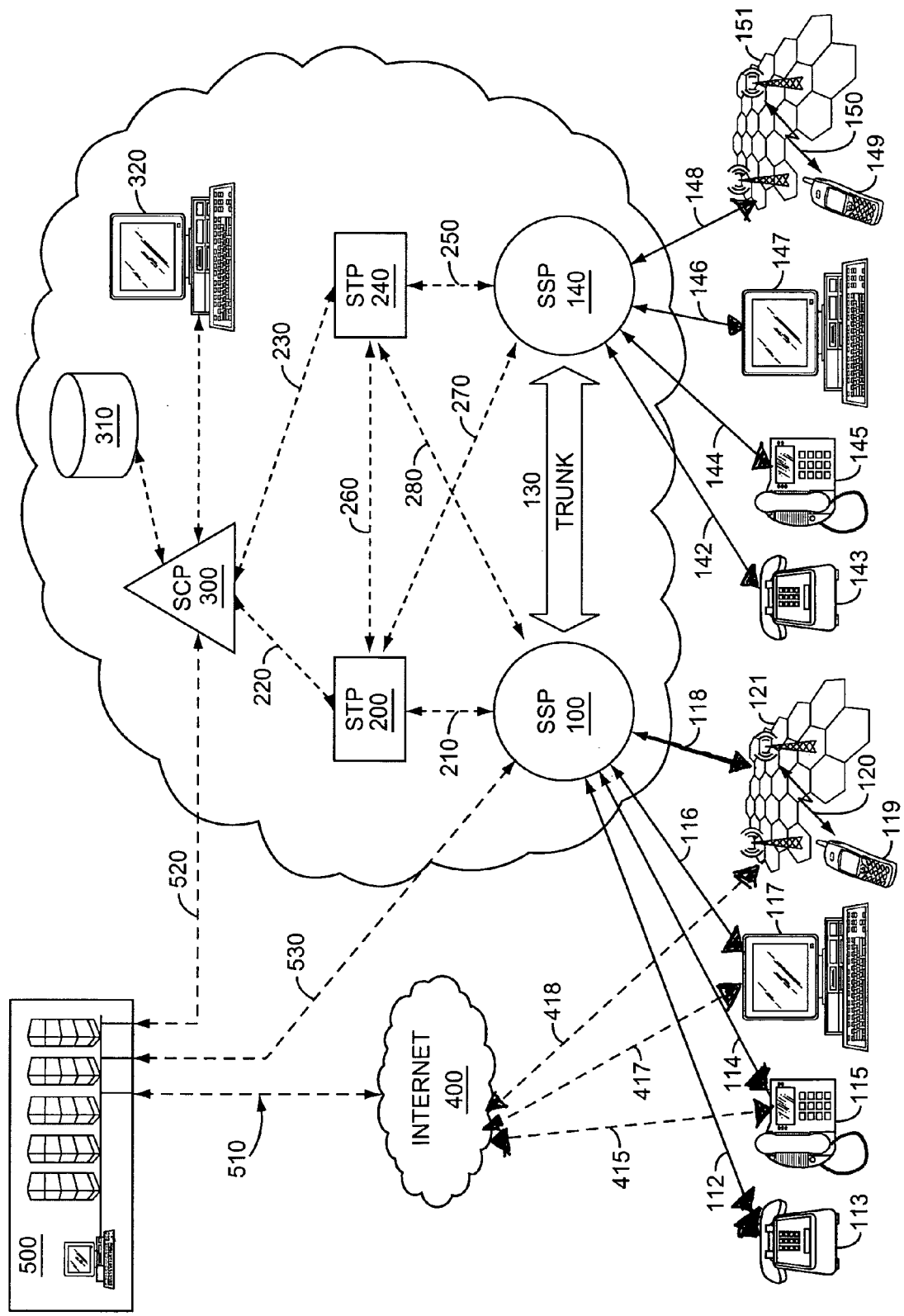
FIG. 2 illustrates a communication environment including aspects of embodiments of the present invention.

FIG. 2 illustrates a preferred embodiment of the present invention disposed in conjunction with elements of the network of FIG. 1. Referring to FIG. 2, a subscriber may establish access to an internet, which may be any data network accessible by the service subscriber, such as an Internet 400, for example, on any number of different subscriber terminals. Examples of subscriber terminals include, for example, computers equipped for internet access (e.g., general purpose computer 117, WebTV® terminals (not shown), etc.); wireless (i.e., cellular) handsets, personal digital assistants ("PDAs"), and e-mail devices (collectively represented by mobile handset 119); or any similar equipment that allows access to, and interaction with, the Internet 400 in accordance with the methods of the present invention. Web-browsers (e.g., Microsoft Internet Explorer®, Netscape Navigator®) typically reside on subscriber terminals to allow the service subscriber to interact with the Internet 400.

Generally, any form of network access connection may be adapted for implementing the instant invention including, but not limited to, dial-up modem access, cable modem access, xDSL access, ISDN access. Referring to FIG. 2, general purpose computer 117 may access the Internet 400 across access connection 417 which may be any of the above-referenced connection types. ISDN terminal 145 may access the Internet 400 using ISDN internet access connection 415. Mobile handset 119 may access the Internet 400 across common air interface 120 to mobile network 121 which in turn provides a wireless access connection 418.

As also shown in FIG. 2, the telephony service provider maintains one or more computers that are connected to, and are capable of interacting with, the Internet 400 or similar distributed network that may be accessed by subscriber terminals. The service provider computers, for example, may comprise a computer server farm 500 illustrated in FIG. 2. In a preferred embodiment of the present invention, server farm 500 (also referred to as "server 500") is capable of interacting with the Internet 400 via network access connection 510 using various protocols such as Transmission Control Protocol/Internet Protocol ("TCP/IP"), Hypertext Transport Protocol ("HTTP"), and File Transfer Protocol ("FTP").

Server 500 also is connected via a packet data network to various network nodes that may implement subscriber services and store information related to those subscriber services. For example, server 500 may communicate with SCP 300 over data network connection 520, and communicate with SSP 100 over data network connection 530. Server 500 communicates with the various nodes using protocols implemented on the PSTN. In a preferred embodiment, server 500 communicates with the network nodes using a messaging protocol designed to query, retrieve and update information associated with various subscriber services. In a more preferred embodiment, server 500 communicates with network nodes using TCAP messages, specifically, TCAP Non-Call Related Messages (e.g., Update Message, Query Request, Query Response) (collectively "NCR messages") to communicate with network nodes.

In a preferred embodiment of the present invention, server 500 may also include an Off-Board Service Control Processor disclosed in commonly assigned U.S. patent application Ser. No. 10/748,816, filed 29 Dec. 2003, entitled "Off-Board Telephony Service Management", to Rajeshwari Zala, et al., the disclosure of which is hereby incorporated by reference. The Off-Board Service Control Processor may facilitate the efficient implementation of the systems and methods of the present invention.

Figure 3:
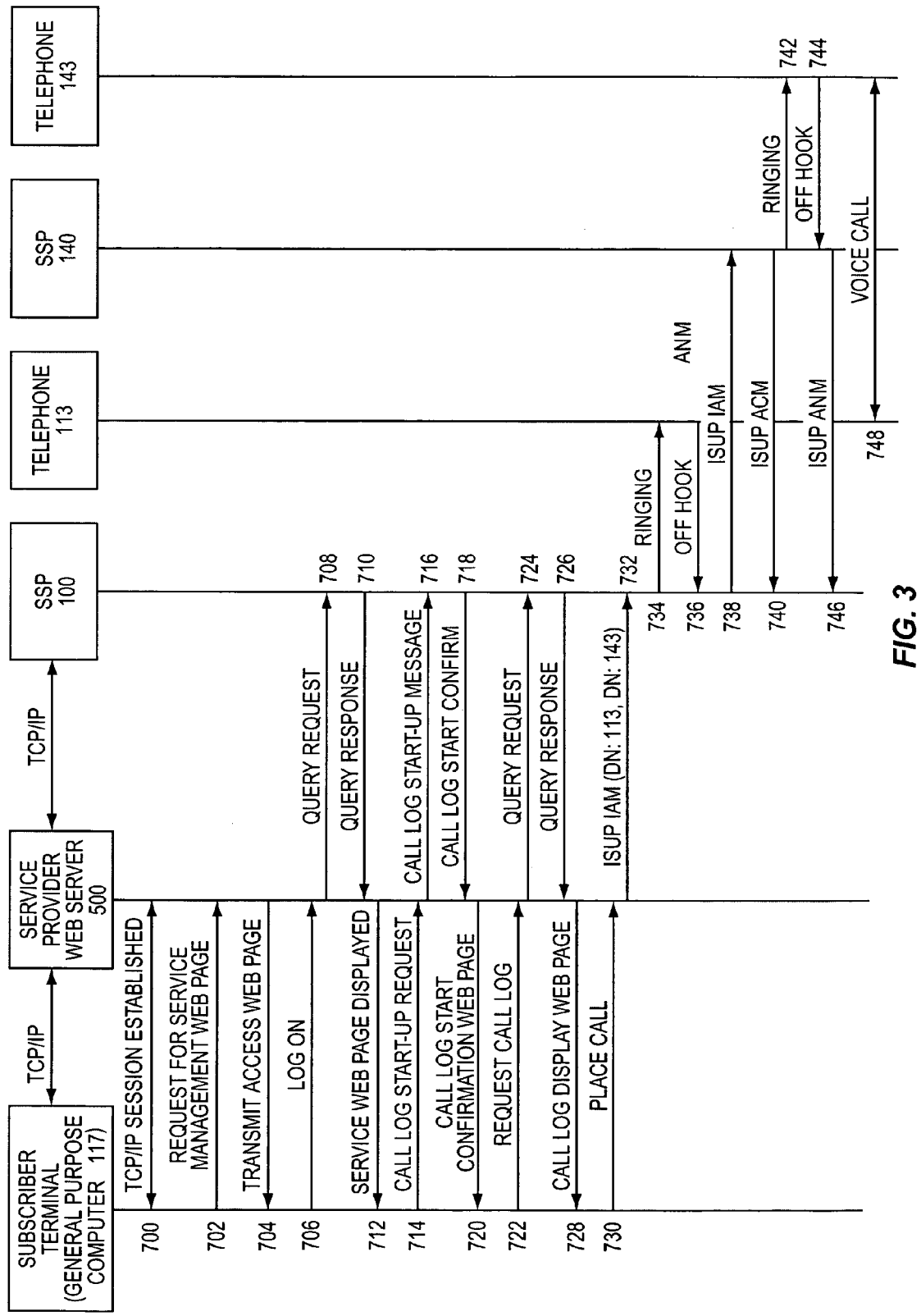
FIG. 3 is a communications flow diagram illustrating aspects of call flow of an embodiment of the present invention.

A preferred embodiment of the present invention may be illustrated by an example of its use. FIG. 3 is a communications flow diagram illustrating aspects of call flow between the elements illustrated in FIG. 2. With reference to FIGS. 2 and 3, as shown in FIG. 3, a telephony service subscriber at a subscriber terminal, e.g., general purpose computer 117, accesses the Internet 400 over internet access connection 417. Using a web-browser residing on the subscriber terminal, the subscriber terminal establishes a communications session with server 500 (step 700) using, for example, the TCP/IP protocol.

The subscriber requests an HTTP-compatible web page located on server 500 that is provided by the telephony service provider to enable service subscribers to manage telephony services (step 702). Typically, the initial web page requested by the service subscriber will be a "front-end" web page that may include certain information about services available to the subscriber. In response to the service subscriber's request, server 500 transmits a service management front-end web pate to the requesting service subscriber (step 704).

In a preferred embodiment of the invention, also included as part of the front-end web page, a service provider may require the subscriber to enter authentication information such as an account number and password in order to log on and gain further access to personalized service information.

In another embodiment of the invention, a service provider may require the subscriber to enter a private access key obtained from the service provider or from a commercial provider of private access keys used to authenticate identity for web-based services.

For example, after entering data in provided fields of the received front-end web page, the subscriber transmits the entered data that constitutes a Log On message (step 706) to server 500. Server 500 receives and processes the Log On message, which in turn triggers server 500 to send a Query Request message over signaling link 530 to SSP 100 seeking information about the subscriber contained in the subscriber's current service profile (step 708).

Service profiles typically include information such as current services available to subscribers, activation status of services, and relevant attributes of services. In a preferred embodiment of the present invention, subscriber service profiles include subscriber privilege level information including, for example, but not limited to, what services particular subscribers, or groups of subscribers, may access using the present invention.

Service profiles are typically stored at EO switches to enable the EO switches to provide subscribers the services to which they have subscribed. In addition, subscriber profiles may be stored at an SCP, e.g., SCP 300, to facilitate service management and billing. In one embodiment of the present invention, copies of subscriber profiles may be stored in a local database associated with server 500 (not shown). If subscriber profiles are maintained at multiple locations, the various copies of the subscriber profiles are periodically reconciled. In a preferred embodiment, the service information management system of the present invention obtains, uses, and updates subscriber profiles stored at the EO switch.

In a preferred embodiment, communications between server 500 and network nodes may be accomplished using standard signaling protocols already used by the network nodes. For example, server 500 may communicate with signaling points in an AIN (e.g., SSP 100 and SCP 300) using TCAP NCR messaging.

After SSP 100 receives the Query Request message, it searches for the requesting subscriber's current service profile. After locating the requested service profile, SSP 100 responds by sending a TCAP Query Response message including all or part of the information from the subscriber's current service profile to server 500 (step 710).

Server 500 receives the Query Response and, in a preferred embodiment, validates authentication information submitted by the service subscriber with information stored in the subscriber's service profile. After server 500 validates the authentication information, it converts the retrieved service profile information into a web-page that includes personalized service information and options available to the requesting service subscriber. Server 500 then transmits the web-page to the requesting subscriber (step 712). The subscriber is then able to determine, for example, what telephony services are available and the current status of available telephony services. In addition, the subscriber may make changes to the subscriber service profile.

In a preferred embodiment, the web page will present the subscriber with the choice to retrieve call-related information. For example, the web page may indicate that the call log service is available to the subscriber for one or more directory numbers ("DN") associated with the subscriber. The web page will preferably indicate whether the call log service is currently active. Assuming that the call log service is available for a certain DN, but not active, the subscriber may decide to activate the service. To do so, the subscriber indicates the desired selection by, for example, selecting or deselecting buttons or check boxes on an HTML web page. The subscriber then transmits the HTML form over the Internet 400 to server 500 (step 714).

Server 500 receives the subscriber's request to activate the call log service and responds by creating and sending a call log service start-up message to SSP 100 (step 716). In turn, SSP 100 receives the call log service start-up and activates the call log service. SSP 100 then sends a call log start confirmation message to server 500 (Step 718). Upon receipt of the call log start confirmation message, server 500 may send a web page to the requesting subscriber containing some form of confirmation that the call log service has been activated (step 720).

While active, a typical call log service may collect and record an array of call-related information at various points-in-call ("PIC") for the directory number for which the service has been activated. For example, a call log may collect and record information for calls attempted from a DN, calls completed from a DN, and calls made to a DN. The information collected at each defined PIC may include, for example, the time of the call, call duration, the directory number of the calling or called part, caller identification information, call routing information, etc.

Using the present invention, a subscriber may access information stored in a call log, or may access information stored by similar services, by requesting download of the information to any subscriber terminal. For example, to start the information download, the service subscriber may use the subscriber terminal to make entries on an HTML web page made available by the service provider, thereby indicating the desired information. In one embodiment, the HTML web page provided to a subscriber would include all DNs associated with the subscriber's service profile. Once the entries are made, the web page can be transmitted to server 500 to initiate the request (step 722).

After receiving the call log request, server 500 generates a TCAP Query Request message to SSP 100 requesting the current call log for one or more requested DNs (step 724). After receiving the TCAP Query Request, SSP 100 retrieves the requested call log information if available. SSP 100 then responds to the Query Request by sending a TCAP Query Response to server 500 (step 726). After receiving the TCAP Query Response, server 500 generates a web-page displaying the requested information from the call log and transmits the web page for the subscriber (step 728).

Once the call log information is received at the subscriber terminal, the requesting subscriber may then use the information in a number of beneficial and useful ways. For example, the subscriber may add or delete entries from the call log thereby freeing space for other information. The subscriber may also download the call log information into a file compatible with contact management or calendar programs so that the information can be saved in these programs without the need for manual entry of the information. It is also possible to add call log information to other services. For example, the subscriber may add a called number appearing on a call log to the subscriber's list of speed call service DNs or to a list of call block service DNs.

According to another embodiment of the present invention, the retrieved call log information may be used by the subscriber to initiate calls to DNs contained in the retrieved call log. In implementing this embodiment of the present invention, the service provider web page containing the retrieved call log information may present also present the subscriber with the choice to place a call to a call log entry DN. One possible implementation of this embodiment is seen by continuing with the example in FIG. 3. As shown in FIG. 3, the service subscriber can transmit a request to place a call to a call log DN to server 500 (step 730).

Upon receipt of the place call request, server 500 generates an ISUP IAM message to SSP 100 indicating both the DN at which the subscriber wishes to take the call, and the DN of the party to be called (step 732). In the example of FIG. 3, the subscriber desires to take the call at analog telephone 113 and desires to call analog telephone 143.

SSP 100 responds to the ISUP IAM by sending a Ringing signal to analog telephone 113 to indicate that the call has been initiated (step 734). When the subscriber takes analog telephone 113 off-hook, an Off-Hook message is received by SSP 100 (step 736) indicating that the subscriber is ready to take the call.

After SSP 100 receives the Off-Hook message, it generates an ISUP AIM message to SSP 140 which provides service to analog telephone 143 (step 738). SSP 140 responds with an acknowledgement ISUP ACM message (step 740). SSP 140 also sends a Ringing signal to analog telephone 143 (step 742). If someone takes analog telephone 143 off-hook, an Off-Hook signal is sent to SSP 140 (step 744) indicating that analog telephone 143 is ready to accept the call.

SSP 140 responds to the Off-Hook signal by sending an ISUP ANM messages to SSP 100 to complete the call set-up (step 746). Once the call has been set up, analog telephone 113 and analog telephone 143 may participate in a voice call placed, for example, over voice trunk 130 (step 748).

In a preferred embodiment, a subscriber may also use the telephony service information management system of the present invention to make changes to the call-related information stored by various telephony services. For example, a subscriber may desire to edit the information stored in a call log service implemented on an EO switch. Using the information management system as described above, a subscriber may request a download of the information stored in a call log service. After receiving the stored information, the subscriber may then, for example, add, delete, or otherwise modify, the call log information stored on the EO switch. Once the subscriber had made the desired changes, the information management system then sends update messages to the EO to make the desired changes. This particular aspect is useful, for example, in enabling subscribers to delete stored information in order to prevent a telephony service from exceeding a maximum number of stored data entries or maximum memory size for subscribers.

Using the system and methods of the present invention, it will be clear to those of ordinary skill in the art to adapt the present invention to access information, activate and deactivate telephony services, and use service information to extend telephony services. Although the call log service has been used in an example of how the present invention functions, the present invention is not limited to that specific feature.

It is to be understood that the present invention illustrated herein may be implemented by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, tape, or any similar media. The media can also be a memory storage device or collection of memory storage devices such as read-only memory (ROM) or random access memory (RAM).

Additionally, the computer program code can be transferred to the appropriate hardware over a data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s). These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

Those skilled in the art will also recognize improvements and modifications to the preferred embodiments of the present invention. All such improvements and modifications are considered within the scope of the concepts disclosed herein and the claims that follow.

What is claimed is:

1. A method of accessing call-related information associated with telephony services implemented in a telephony network having a plurality of telephony network nodes serving a plurality of service subscribers, comprising:
   a) receiving from a subscriber terminal a request for the call-related information;
   b) sending a subscriber identification request for display at the subscriber terminal;
   c) receiving a response to the subscriber identification request including subscriber authentication data;
   d) converting at least a portion of the subscriber authentication data into a format compatible with the plurality of telephony network nodes serving the plurality of service subscribers, to provide converted subscriber authentication data;
   e) transmitting a request for at least a part of a service profile for a requesting service subscriber to a network node maintaining a database of service profiles, wherein the transmitted request includes the converted subscriber authentication data;
   f) receiving from the network node maintaining the database of service profiles, the at least a part of the service profile for the requesting service subscriber, to provide received service profile information;
   g) validating the subscriber authentication data;
   h) converting the request for call-related information into a format compatible with the plurality of telephony network nodes serving the plurality of service subscribers, to provide a converted call-related information request;
   i) transmitting the converted call-related information request to a telephony network node maintaining a log of call-related information for the requesting service subscriber;
   j) receiving at least a part of the log of call-related information for the requesting service subscriber from the telephony network node maintaining the log of call-related information for the requesting service subscriber, to provide a received log of call-related information; and
   k) transmitting the received log of call-related information to the subscriber terminal.

2. The method of claim 1, further comprising:
   receiving from the subscriber terminal a request to activate a telephony service;
   converting the request to activate the telephony service into a format compatible with the plurality of telephony network nodes serving the plurality of service subscribers, to provide a converted service activation request; and
   transmitting the converted service activation request to a telephony network node controlling telephony services for the requesting service subscriber.

3. The method of claim 1, further comprising:
   receiving from the subscriber terminal a request to initiate a call to a directory number associated with the received log of call-related information;
   converting the request to initiate the call into a format compatible with the plurality of telephony network nodes serving the plurality of service subscribers, to provide a converted call initiation request; and
   transmitting the converted call initiation request to a telephony switch serving the requesting service subscriber.

4. The method of claim 1, wherein the service profile for the requesting service subscriber includes privilege level information.

5. The method of claim 1, wherein validating the subscriber authentication data further comprises:
   comparing the subscriber authentication data with the received service profile information; and
   if the subscriber authentication data matches at least a part of the received service profile information, permit the requesting service subscriber to access the received log of call-related information.

6. The method of claim 5, wherein the subscriber authentication data comprises data sufficient to uniquely identify the requesting service subscriber.

7. The method of claim 5, wherein the subscriber authentication data comprises a private access key.

8. The method of claim 2, wherein the request for call-related information is converted to a format compatible with communications protocols utilized by signaling points existing on a public switched telephone network to provide the converted call-related information request, and wherein the request to activate the telephony service is also converted to a format compatible with communications protocols utilized by signaling points existing on the public switched telephone network to provide the converted service activation request.

9. The method of claim 2, wherein the request for call-related information is converted to Common Channel Signaling System Number 7 (SS7) Transaction Capabilities Application Part (TCAP) non-call related (NCR) messages to provide the converted call-related information request, and wherein the request to activate the telephony service is also converted to Common Channel SS7 TCAP NCR messages to provide the converted service activation request.

10. The method of claim 1, wherein the log of call-related information is maintained in a call log service.

11. A telephony service information management system for accessing call-related information associated with telephony services implemented in a telephony network having a plurality of telephony network nodes serving a plurality of service subscribers, comprising:
   a) a first interface disposed to communicate with a subscriber terminal;
   b) a second interface disposed to communicate with the plurality of telephony network nodes;
   c) a control system, associated with the first interface and the second interface, adapted to:
      i) receive from a subscriber terminal a request for the call-related information;
      ii) send a subscriber identification request for display at the subscriber terminal;
      iii) receive a response to the subscriber identification request including subscriber authentication data;
      iv) convert at least a portion of the subscriber authentication data into a format compatible with the plurality of telephony network nodes serving the plurality of service subscribers, to provide converted subscriber authentication data;
      v) transmitting a request for at least a part of a service profile for a requesting service subscriber to a network node maintaining a database of service profiles, wherein the transmitted request includes the converted subscriber authentication data;
      vi) receive from the network node maintaining the database of service profiles, the at least a part of the service profile for the requesting service subscriber, to provide received service profile information;
      vii) validate the subscriber authentication data;
      viii) convert the request for call-related information into a format compatible with the plurality of telephony network nodes serving the plurality of service subscribers, to provide a converted call-related information request;
      ix) transmit the converted call-related information request to a telephony network node maintaining a log of call-related information for the requesting service subscriber;
      x) receive at least a part of the log of call-related information for the requesting service subscriber from the telephony network node maintaining the log of call-related information for the requesting service subscriber, to provide a received log of call-related information; and
      xi) transmit the received log of call-related information to the subscriber terminal.

12. The telephony service information management system of claim 11, wherein the control system is further adapted to:
   receive from the subscriber terminal a request to activate a telephony service;
   convert the request to activate the telephony service into a format compatible with the plurality of telephony network nodes serving the plurality of service subscribers, to provide a converted service activation request; and
   transmit the converted service activation request to a telephony network node controlling telephony services for the requesting service subscriber.

13. The telephony service information management system of claim 11, wherein the control system is further adapted to:
   receive from the subscriber terminal a request to initiate a call to a directory number associated with the received log of call-related information;
   convert the request to initiate the call into a format compatible with the plurality of telephony network nodes serving the plurality of service subscribers, to provide a converted call initiation request; and
   transmit the converted call initiation request to a telephony switch serving the requesting service subscriber.

14. The telephony service information management system of claim 11, wherein the service profile for the requesting service subscriber includes privilege level information.

15. The telephony service information management system of claim 11, wherein validating the subscriber authentication data further comprises:
   comparing the subscriber authentication data with the received service profile information; and
   if the subscriber authentication data matches at least a part of the received service profile information, permit the requesting service subscriber to access the received log of call-related information.

16. The telephony service information management system of claim 15, wherein the subscriber authentication data comprises data sufficient to uniquely identify the requesting service subscriber.

17. The telephony service information management system of claim 15, wherein the subscriber authentication data comprises a private access key.

18. The telephony service information management system of claim 12, wherein the request for call-related information is converted to a format compatible with communications protocols utilized by signaling points existing on a public switched telephone network to provide the converted call-related information request, and wherein the request to activate the telephony service is also converted to a format compatible with communications protocols utilized by signaling points existing on the public switched telephone network to provide the converted service activation request.

19. The telephony service information management system of claim 12, wherein the request for call-related information is converted to Common Channel Signaling System Number 7 (SS7) Transaction Capabilities Application Part (TCAP) non-call related (NCR) messages to provide the converted call-related information request, and wherein the request to activate the telephony service is also converted to Common Channel SS7 TCAP NCR messages to provide the converted service activation request.

20. The telephony service information management system of claim 11, wherein the log of call-related information is maintained in a call log service.

21. A telephony service information management system for accessing call-related information associated with telephony services implemented in a telephony network having a plurality of telephony network nodes serving a plurality of service subscribers, comprising:
   a) means for communicating with a subscriber terminal connected to a public data network;
   b) means for communicating with the plurality of telephony network nodes;
   c) means for controlling the means for communicating with the subscriber terminal connected to the public data network, and the means for communicating with the plurality of telephony network nodes, including:
i) means for receiving from the subscriber terminal a request for the call-related information;
ii) means for sending a subscriber identification request for display at the subscriber terminal;
iii) means for receiving a response to the subscriber identification request including subscriber authentication data;
iv) means for converting at least a portion of the subscriber authentication data into a format compatible with the plurality of telephony network nodes serving the plurality of service subscribers, to provide converted subscriber authentication data;
v) means for transmitting a request for at least a part of a service profile for a requesting service subscriber to a network node maintaining a database of service profiles, wherein the transmitted request includes the converted subscriber authentication data;
vi) means for receiving from the network node maintaining the database of service profiles, the at least a part of the service profile for the requesting service subscriber, to provide received service profile information
vii) means for validating the subscriber authentication data;
viii) means for converting the request for call-related information into a format compatible with the plurality of telephony network nodes serving the plurality of service subscribers, to provide a converted call-related information request;
ix) means for transmitting the converted call-related information request to a telephony network node maintaining a log of call-related information for the requesting service subscriber;
x) means for receiving at least a part of the log of call-related information for the requesting service subscriber from the telephony network node maintaining the log of call-related information for the requesting service subscriber, to provide a received log of call-related information; and
xi) means for transmitting the received log of call-related information to the subscriber terminal.

22. The telephony service information management system of claim 21, wherein means for validating the subscriber authentication data further comprises:
means for comparing the subscriber authentication data with the received service profile information; and
if the subscriber authentication data matches at least a part of the received service profile information, permit the requesting service subscriber to access the received log of call-related information.

23. The telephony service information management system of claim 22, wherein the subscriber authentication data comprises data sufficient to uniquely identify the requesting service subscriber.

24. The telephony service information management system of claim 21, wherein the means for controlling further comprises:
means for receiving from the subscriber terminal a request to activate a telephony service;
means for converting the request to activate the telephony service into a format compatible with the plurality of telephony network nodes serving the plurality of service subscribers, to provide a converted service activation request; and
means for transmitting the converted service activation request to a telephony network node controlling telephony services for the requesting service subscriber.

25. The telephony service information management system of claim 21, wherein the means for controlling further comprises:
means for receiving from the subscriber terminal a request to initiate a call to a directory number associated with the received log of call-related information;
means for converting the request to initiate the call into a format compatible with the plurality of telephony network nodes serving the plurality of service subscribers, to provide a converted call initiation request; and
means for transmitting the converted call initiation request to a telephony switch serving the requesting service subscriber.

26. The telephony service information management system of claim 21, wherein the request for the call-related information is converted to a format compatible with communications protocols utilized by signaling points existing on a public switched telephone network to provide the converted call-related information request, and wherein the request to activate the telephony service is also converted to a format compatible with communications protocols utilized by signaling points existing on the public switched telephone network to provide the converted service activation request.

* * * * *